(12) United States Patent
Croce et al.

(10) Patent No.: US 6,300,747 B1
(45) Date of Patent: Oct. 9, 2001

(54) CIRCUIT HAVING REDUCED LOSSES OCCURRING DURING TRANSFORMING SWITCHING ADJUSTING OR CONTROLLING ELECTRIC POWER

(76) Inventors: Wolfgang Croce, Mantscha 160, A-8052 Graz; Günther Danhofer, Kalvariengürtel 48a, A-8020 Graz, both of (AT)

( * ) Notice: Subject to any disclaimer, the term of this patent is extended or adjusted under 35 U.S.C. 154(b) by 0 days.

(21) Appl. No.: 09/530,860
(22) PCT Filed: Nov. 10, 1998
(86) PCT No.: PCT/AT98/00277
  § 371 Date: May 5, 2000
  § 102(e) Date: May 5, 2000
(87) PCT Pub. No.: WO99/25061
  PCT Pub. Date: May 20, 1999

(30) Foreign Application Priority Data

Nov. 11, 1997 (AT) .................................................. 1908/97

(51) Int. Cl.[7] ............................... G05F 1/00; H02M 3/335
(52) U.S. Cl. .............................................. 323/215; 363/20
(58) Field of Search .................................. 363/65, 71, 20, 363/21; 323/215, 247

(56) References Cited

U.S. PATENT DOCUMENTS

| 4,896,092 |   | 1/1990 | Flynn ........................... 323/258 |
| 4,991,075 | * | 2/1991 | Saitou et al. ................. 363/15 |
| 5,008,795 | * | 4/1991 | Parsley et al. ............... 363/20 |
| 5,352,346 |   | 10/1994 | Rodriguez .................... 204/228 |
| 5,545,971 |   | 8/1996 | Gomez et al. ................ 323/259 |
| 5,563,780 | * | 10/1996 | Goad ............................. 363/71 |
| 5,907,479 | * | 5/1999 | Leu .............................. 363/16 |
| 6,040,986 | * | 3/2000 | Sakamoto et al. ........... 363/20 |

FOREIGN PATENT DOCUMENTS

| 3511182 | 10/1996 | (DE) . |
| 29707769 | 6/1997 | (DE) . |
| 0053413 | 6/1982 | (EP) . |
| 0570839 | 11/1993 | (EP) . |

* cited by examiner

Primary Examiner—Adolf Deneke Berhane
(74) Attorney, Agent, or Firm—Ladas & Parry

(57) ABSTRACT

The invention relates to a circuit for transforming, switching, adjusting or controlling electric power, comprising an electric source 1, a load 2, and a device 3 for transforming, switching, adjusting or controlling the electric power resulting on the load 2. To reduce the losses, it is provided that the device 3 is formed by at least one transformer 10, 10', whose secondary side overlays the source 1 and whose primary side is connected with a control device 11, whereby at certain points of time and for certain periods of time, a voltage or a current can be produced at the primary side of the transformer 10, 10', which voltage or current induces a voltage or a current, respectively, at the secondary side of the transformer 10, 10', which voltage or current, respectively, is equal to the voltage or current, respectively, of the source 1 at this point of time and for that period of time. Thus, conventional electronic valves can be substituted by a transformer 10, 10', and the losses usually occurring can be markedly reduced thereby.

10 Claims, 7 Drawing Sheets

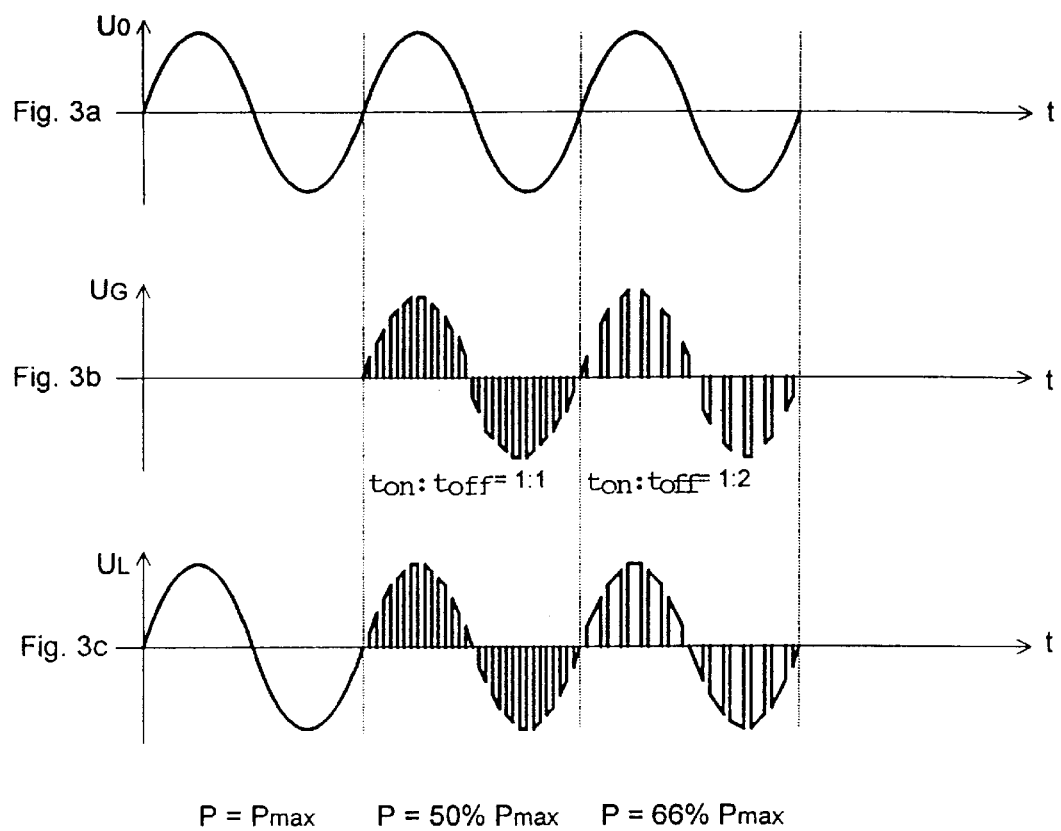
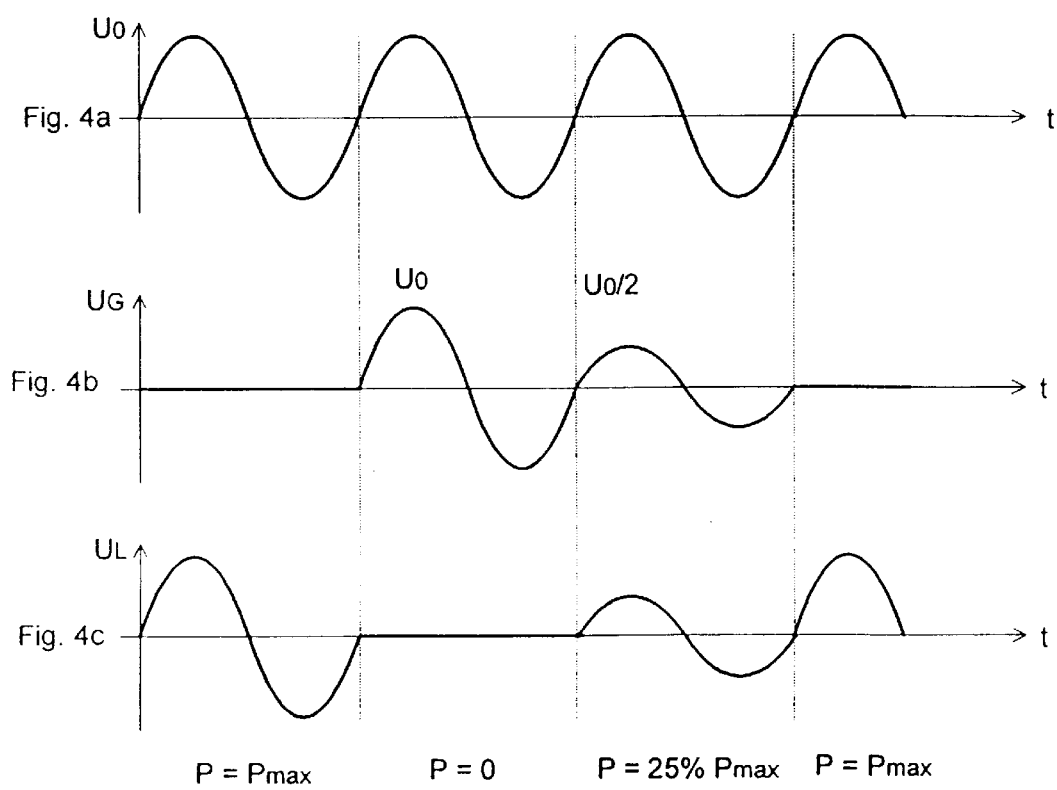

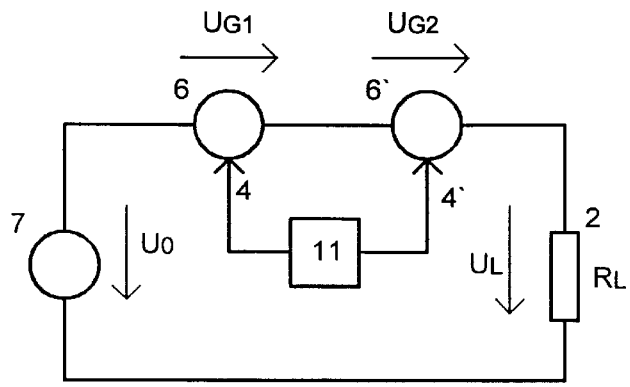
Fig. 5
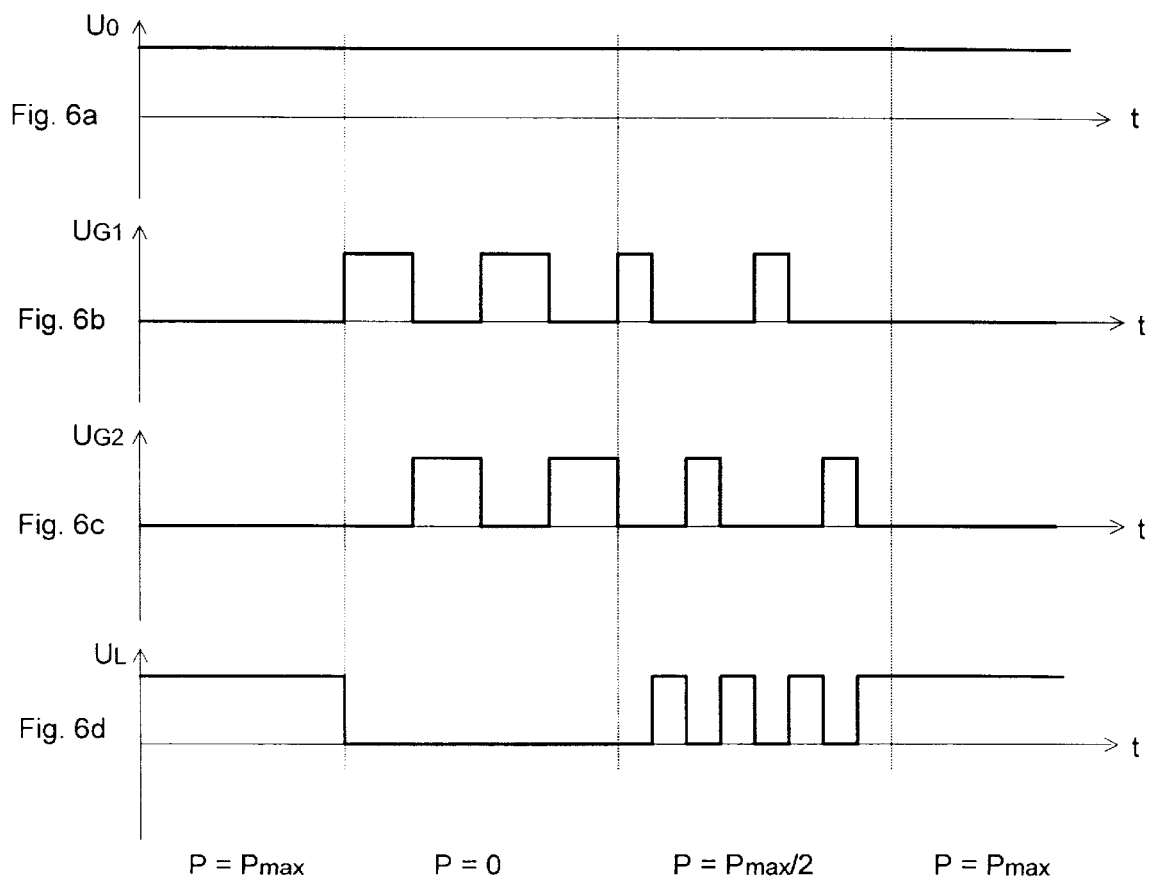

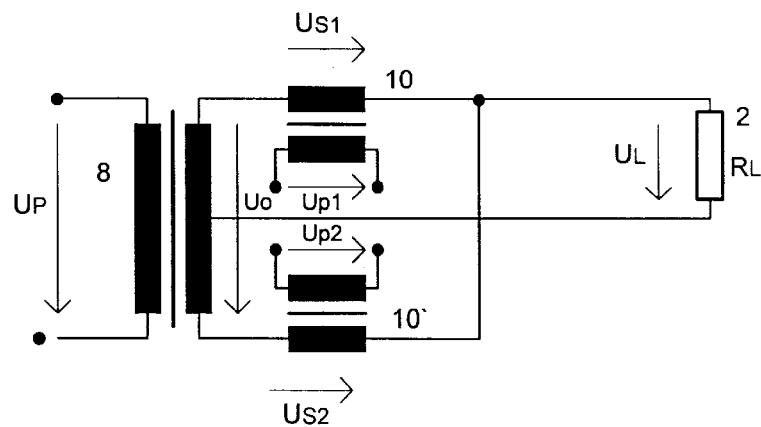
Fig. 14
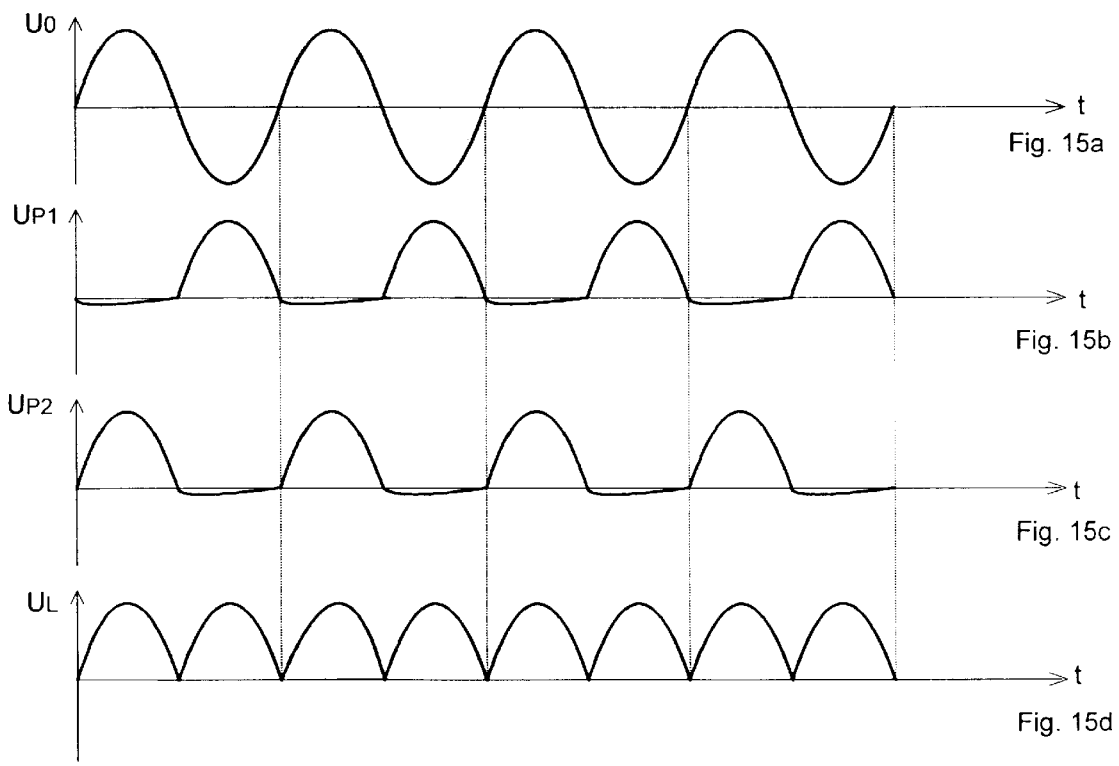
Fig. 15a
Fig. 15b
Fig. 15c
Fig. 15d

CIRCUIT HAVING REDUCED LOSSES OCCURRING DURING TRANSFORMING SWITCHING ADJUSTING OR CONTROLLING ELECTRIC POWER

BACKGROUND OF THE INVENTION

The invention relates to a circuit for transforming, switching, adjusting or controlling electric power, with an electric source, a load, and at least one means for transforming, switching, adjusting or controlling the electric output at the load.

In this connection, the transforming, switching, adjusting and controlling of electric power comprises all the methods or switching arrangements, respectively, by which electric power at a power mains is passed on to a consumer to a desired extent, in a desired manner and at a desired point of time. The adjustment or control may serve to provide a certain changeable power to a consumer or to provide always the same power to a changeable consumer. Also switching of electric power is included in this context. Usually, adjustment or control of electric power is effected by changing the voltage and/or the current of the source. Transforming of electric power occurs, e.g., during rectification, wherein an alternating-current voltage is transformed into a direct current voltage.

Previously, changing of the power has been obtained, e.g., by means of series resistors which have been switched on and off by means of analogous switches. Besides the limited switching frequency, such a solution also has the drawback that change can only occur in fixed steps. Moreover, series resistors involve very high losses in the form of heat which must be conducted away by cooling means. Power semiconductors used instead of analogous switches did bring certain improvements in the switching method, yet they did not reduce the losses.

In the absence of resistors, transforming, switching, adjusting or controlling is effected by means of electronic valves which change the power via the voltage or the current, e.g., by modulating the pulse widths. The term "electronic valves" refers to controlled and uncontrolled semiconductor construction elements. The controlled semiconductor construction elements are controlled either by the electric current supplied to an electrode or through electric potential applied to such an electrode. They include, e.g., bipolar and unipolar transistors, thyristors or comparable electronic construction elements. Diodes in which the current is a function of the voltage belong, e.g., to the uncontrolled electronic valves. In the connected-through state, the electronic valves have forward power losses, since in the conducting state always a certain voltage drop occurs at the valves. Although these losses are lower than those in series resistors, yet particularly in case of very high currents or very high voltages they may still be quite substantial. In such instances, these electronic valves must be dimensioned accordingly, and usually also equipped with corresponding cooling elements so that the losses which have been converted into heat can be conducted away.

SUMMARY OF THE INVENTION

Many circuits serve to compensate deviating electric parameters of supply and to keep the energy on a load independent of such supply fluctuations. For this purpose, the supply is overlaid with a voltage by means of transformers, which voltage compensates for such deviations. DE 35 11 182 A1, e.g., describes a transformer circuit comprising an adjustment unit via which the amplitude of a supply voltage delivered by a voltage source can be changed. DE 297 07 769 U1 discloses a circuit for adjusting an alternating current consumer voltage. For a simplified type of voltage adjustment, the source is overlaid by a transformer connected with a control. The alternating current voltage regulator according to U.S. Pat. No. 5,545,971 A employs a transformer connected with a control device so as to achieve an adjustment of the output voltage which is independent of any possible supply or load fluctuations. The transformers used in each of these circuits are power transformers which cause corresponding losses.

The present invention thus has as its object to provide a switch in which losses occurring during transforming, switching, adjusting or controlling electric power can be markedly reduced. The switch shall be realizable as inexpensively as possible so as to ensure a broad field of application.

This object is achieved in that the or each device for transforming, switching, adjusting or controlling the electric power is formed by at least one transformer, wherein the secondary side of the or each transformer overlays the source, and the primary side of the or each transformer is connected with a control device, which control device causes a voltage or a current, respectively, at predetermined points of time and for predetermined periods of time, substantially at the point of time of zero crossing of the voltage or of the current, respectively, of the source, and on the secondary side of the or each transformer, a voltage or current, respectively, of identical amplitude as the voltage or current, respectively, of the source is induced so that at the predetermined points of time and for the predetermined periods of time, the voltage or the current, respectively, of the source and the voltage or the current, respectively, of the or each transformer will cancel each other out. The term "source" may include both, sources of voltage and sources of current. The or each transformer forms a counter-source which overlays the source and replaces the conventional electronic valves, such as diodes, transistors or the like, and therefore their forward power losses likewise cease to exist. By the fact that the voltage or current, respectively, at the secondary side of the or each transformer has the same amplitude as the voltage or current, respectively, of the source, when the counter-voltage source is switched on, zero voltage will result as viewed from the load, since the source and the counter-source will cancel each other out at the pre-determined points of time and for the pre-determined periods of time. By the fact that the control device causes a voltage or a current substantially at the point of time of zero crossing of the source voltage or of the source current, respectively, it is ensured that the or each transformer will only be activated if load current does not flow over its secondary side, and thus activation losses, given by the product of the secondary-side voltage and the secondary-side current, will be at a minimum. The change of the electric power is effected exclusively over temporal parameters of the counter-source(s). Since current does not flow in these instances, the required power of the counter-source formed by the or each transformer which results from the product of voltage and current thus will also be negligibly low. At the load a power will result which results from the overlay of the source voltage and the counter-voltage or from the source current and the counter-current in connection with the load resistor. With the invention, the element in the circuit which includes a resistor on which a voltage drop occurs which is converted into dissipated heat, is omitted. On account of the substantial reduction of losses, the construction elements required can be made substantially smaller, and cooling means can be avoided. Thus, circuits for carrying out the method according to the invention will be substantially smaller, lighter and also cheaper. This opens up a number of possible fields of application, and particularly new perspectives if higher currents and/or voltages occur.

To achieve a respective change of the power, the frequency and/or the pulse ratio of the voltage or of the current, respectively, of the secondary side of the or each transformer is changed by means of the control device. These parameters are relatively easy to change by a corresponding electronic control means or electronic power means which changes the primary voltage or the primary power of the or each transformer.

Advantageously, the diameter of the wire or the number of wire strands forming the secondary winding of at least one transformer is large relative to the diameter of the wire or to the number of wire strands forming the primary winding of at least one transformer and/or the number of turns of the primary winding of at least one transformer is high relative to the number of turns of the secondary winding of at least one transformer. In this manner, by applying a low current at the primary side or of a low voltage at the primary side, a sufficiently high secondary current or a sufficiently high secondary voltage will be attained which is made to overlay the source power or the source voltage, respectively, for the purpose of changing the power on a load. To produce as high a current or as high a voltage as possible at the secondary side, with as low a current or as low a voltage as possible on the primary side of the transformer, not only the turn ratio and the wire geometry are decisive. The secondary voltage of a magnetically coupled circuit is proportional to the temporal change of the magnetic flow. By rapidly changing e.g. the voltage at the primary side, a high secondary voltage can be produced which would be far higher than the levels determined by the turn ratios. This method is, e.g., employed in the ignition transformer for a flash light, where as high an ignition voltage as possible is produced with as low a primary power as possible. Besides the high rising speed of the primary side voltage, the turn ratios (number of turns, wire cross sections), the magnetic coupling between primary and secondary circuit, the magnetic core material used and the size of the transformer are decisive for as high a secondary-side voltage as possible. In practice, the transformer is chosen to be as small as possible so that it can store as little magnetic energy as possible when the load current flows therethrough and it is not activated from the primary side, so that it will be saturated as quickly as possible.

Advantageously, the device for changing the parameters of the or each counter-source is formed by a microcontroller or microprocessor. This offers a higher degree of flexibility and can be realized at low cost.

If the control device is connected with the source, the control can be synchronized with the source, thus optimizing the conditions.

BRIEF DESCRIPTION OF THE DRAWINGS

Further features of the invention will be explained in more detail by way of the accompanying Figures and time diagrams.

FIGS. 3a–3c show the courses of time of characteristic parameters from the circuit according to FIG. 2, FIGS. 4a–4c show alternative courses of time of characteristic parameters from the circuit according to FIG. 2, FIG. 5 shows a circuit for carrying out the method according to the invention with a source of direct voltage, FIGS. 6a–6d show the courses of time of characteristic parameters from the circuit according to FIG. 5, FIGS. 7a–7e show a single-wave rectifier according to the prior art and according to various embodiments of the invention, FIG. 14 shows a circuit according to the invention for full-wave rectification without diodes, and FIGS. 15a–15d show the courses of time of characteristic parameters from the circuit according to FIG. 14.

DETAILED DESCRIPTION

Figure 1:
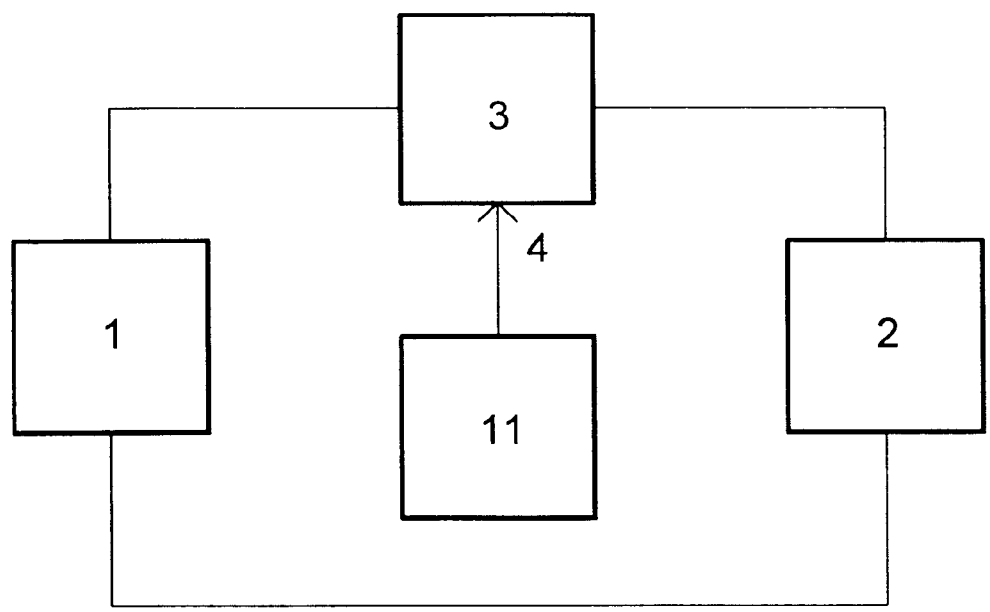
FIG. 1 shows a diagram of a circuit for transforming, switching, adjusting or controlling electric power.

FIG. 1 shows the diagram of a circuit for transforming, switching, adjusting or controlling electric power. Therein, a source 1 is connected with a load 2 via a device 3. The source 1 may be a voltage or current source. The device 3 may be formed by an analogous switch, a voltage divider, a control circuit or the like, depending on the respective application. Via any possible control input 4, the electric power delivered to the load 2 may be switched or changed. A control device 11 provides the respective signals at the control input 4. An example of such a circuit is a single-wave rectifier in which the device 3 is formed by a diode. The power adjustment on a resistor may, e.g., be effected via a controlled, electronic valve, such as a transistor whose basis represents the control input 4.

Figure 2:
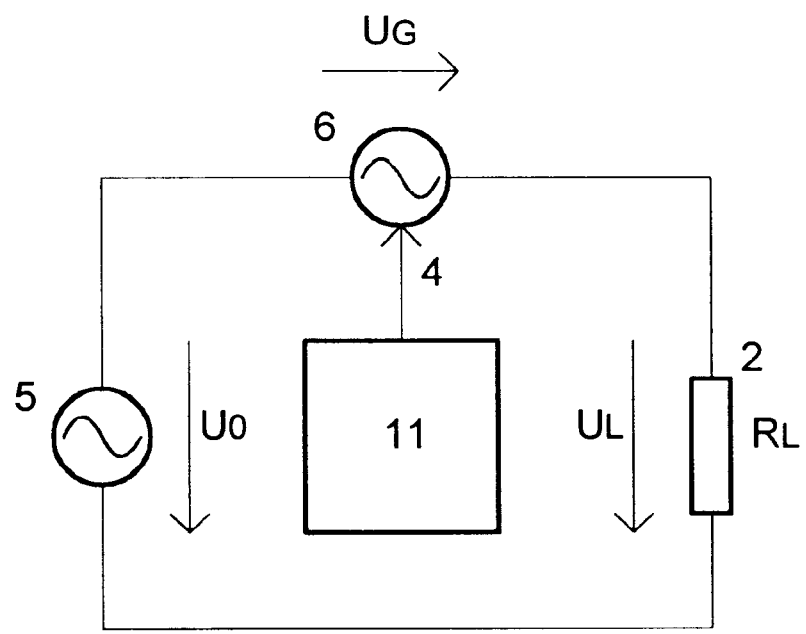
FIG. 2 shows a circuit for carrying out the method according to the invention with a source of alternating current voltage.

In FIG. 2, a circuit for carrying out the method according to the invention with a source of alternating-current voltage is illustrated. In this instance, a counter-voltage source 6 is connected to the voltage source 5 which has control input 4 for transforming, switching, adjusting or controlling the power $P_L$ or voltage $U_L$ resulting at the load 2, which control input is connected with respective control device 11. Advantageously, the counter-voltage source 6 produces a voltage $U_G$ which is equal to the voltage $U_0$ of the voltage source 5. By switching the counter-voltage source 6 on and off, the voltage $U_L$ and thus, the power $P_L$ on the load resistor $R_L$ can be changed. In known methods, this power adjustment is, e.g., carried out with a transistor which has quite substantial forward power losses in addition to switching losses in the connected-through state. The latter exceed the switching losses, particularly at low switching frequencies. Particularly in fields of application involving a relatively high current or a relatively high voltage, these forward power losses are quite substantial and require correspondingly dimensioned semiconductors and cooling means. In contrast, in the present invention forward power losses do not occur since the electronic valves have been replaced by the counter-source 6. The counter-voltage source may, e.g., be realized by a transformer whose secondary side has been switched into the circuit and whose primary side is activated by a corresponding control voltage. In practice, the secondary winding of the transformer representing the counter voltage source 6 will have a low number of turns and a high wire cross-section so that the losses caused by ohmic resistance of the winding will be low. In contrast thereto, the primary winding of the transformer will have a relatively high number of turns. By adapting the counter-voltage to the source voltage, the activating powers of the primary winding will be negligible, since, ideally, voltages need only be produced when current does not flow.

The method according to the invention is, of course, also applicable in an analogous manner to power sources.

In FIGS. 3a–3c, the time of the source voltage $U_0$, the counter-voltage $U_G$ as well as the voltage $U_L$ at the load resistor are illustrated. During the first period of the source voltage $U_0$, no counter-voltage $U_G$ will be induced, and thus the highest possible voltage $U_L$ will be applied to the load resistor $R_L$, resulting in a maximum load $P_L=P_{max}$ at the load resistor. During the second period, a counter-voltage $U_G$ which has the same amplitude as the source voltage $U_0$ will be switched on and off with a certain frequency, the ratio of the switch-on time $t_{on}$ to the switch-off time $t_{off}$ being equal to 1. Thus, the voltage $U_L$ will be applied to the load resistor $R_L$ for half the time only, and therefore the resulting power $P_L$ at the load resistor $R_L$ will only be 50% of the maximum power $P_{max}$. By changing the pulse ratio $t_{on}:t_{off}$, the power $P_L$ on the load resistor $R_L$ can be varied. In the third period, the situation is illustrated in which $t_{on}:t_{off}=1:2$, and thus the voltage $U_L$ will be applied to the load resistor $R_L$ for ⅔ of the time, resulting in a power $P_L=66\%P_{max}$.

From FIGS. 4a–4c, a variant is illustrated, wherein a change of the voltage $U_L$ and thus of the power $P_L$ is attained at the load resistor $R_L$ by varying the amplitude of the counter-voltage source $U_G$. As compared to the variant illustrated in FIGS. 3a–3c, this solution has, however, the disadvantage that current always flows which particularly may cause losses in the counter-source. In case of equally high voltages $U_0=U_G$, current will not flow during those times in which the counter-voltage source is switched on, and hence losses will not result.

FIG. 5 shows a circuit for carrying out the method of the invention with a direct voltage source 7. According to the invention, the direct voltage source 7 is overlaid by two counter-voltage sources 6, 6', which can be switched via the control inputs 4, 4'. Two counter-voltage sources 6, 6' are required since, when realizing these counter voltage sources 6, 6' by transformers, the latter have to be demagnetized cyclically. Therefore, it will be alternatingly switched cyclically to and from between the counter-voltage source 6 and the counter-voltage source 6'.

In the course of time of the source voltage $U_0$, the counter-voltages $U_{G1}$ and $U_{G2}$ as well as the resulting voltage $U_L$ at the load resistor according to FIGS. 6a–6d, the function of the circuit according to FIG. 5 is explained. The direct voltage source 7 supplies a voltage $U_0$. In the first time section, both counter voltage sources 6, 6' do not supply any voltage, so that full voltage $U_L=U_0$ will be applied to the load resistor $R_L$, resulting in a maximum power $P_{max}$ at load 2. During the second span of time, the counter-voltage sources 6, 6' which each supply a voltage $U_G=U_0$ and $U_{G2}=U_0$, are alternatingly switched so that no voltage will be applied to the load resistor $R_L$. While the counter-voltage source 6 is switched on, the second counter voltage source 6' will be demagnetized, and vice-versa. In the third time interval illustrated, the switch-on time $t_{on}$ of the counter-voltage sources 6, 6' is reduced as compared to the switch-off time, e.g. at a ratio of $t_{on}:t_{off}=1:2$ so that at the output, as the mean, half the maximum power $P_{max}$ will result. With the circuit according to FIG. 5, thus the power at a load 2 can be switched, adjusted or controlled without using electronic valves.

Figure 7A:
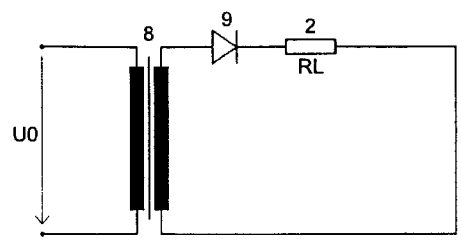
Figure 7B:
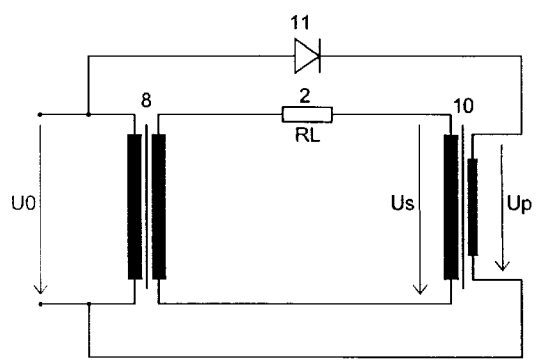
Figure 7C:
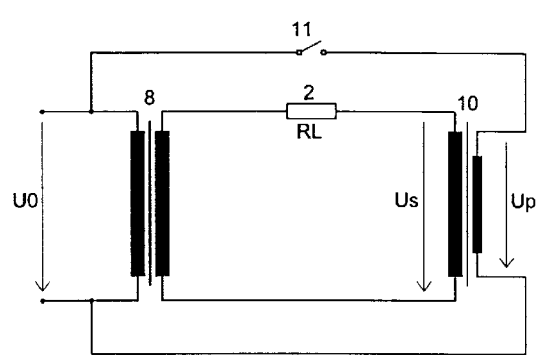
Figure 7D:
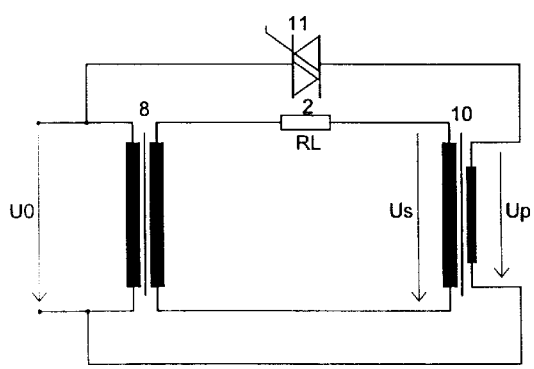
Figure 7E:
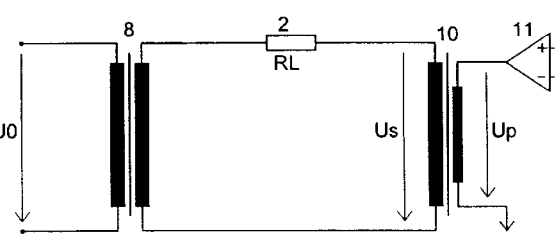

In FIGS. 7a to 7e, the invention will be explained in more detail by way of a single-wave rectifier. FIG. 7a shows a single-wave rectifier of conventional construction with a rectifying diode 9 which rectifies the voltage coming from the power transformer 8, on a load 2. In FIG. 7b, according to the invention the device for transforming, switching, adjusting or controlling the electric power, in this case the rectifying diode 9, has been replaced by the transformer 10 whose primary side is connected with the input voltage $U_0$ via the control device 11 formed by a diode. The transformer 10 may be substantially smaller in design since only a very low power will occur there. In FIG. 7c, the control device 11 is formed by a switch. FIG. 7d shows a variant of an embodiment in which the control device is formed by a triac. Finally, FIG. 7e shows a variant of an embodiment of the invention in which the control device 11 is formed by an operational amplifier, wherein, advantageously, a connection with the source voltage $U_0$ is provided (not illustrated). To make the reduction of the power by the circuit according to the invention more clear, the losses are estimated in the following by way of FIGS. 7a and 7b. When using a power transformer with 460 VA, primary 230 volts and 2 amperes and, at the secondary side, 11.5 volts and 40 amperes, assuming a voltage drop of 0.75 volts at the rectifier diode 9, a power loss at the rectifier diode 9 of 0.75 volts*40 amperes=30 watts will occur. In contrast, with the circuit according to FIG. 7b, the following parameters occur: transformer 10: primary side 230 volts, 0.022 amperes, secondary 11.5 volts and 0.43 amperes, resulting in a power loss at the diode used as control device 11 of 0.75 volts*0.022 amperes=0.017 watts. At the transformer 10 which, according to the invention, substitutes the rectifier diode 9 as compared to the circuit according to FIG. 7a, not any losses worthy of mention will occur, since during the activation of the transformer 10, no load current will flow over its secondary side, since the source voltage and the secondary voltage of the transformer 10 will cancel each other out.

Figure 8A:
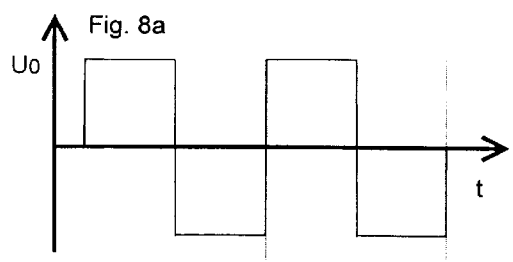
FIGS. 8a, 8c, 9a–9c, 10a–10c and 11a–11c show simplified courses of time of characteristic parameters from the circuits according to FIGS. 7b to 7e for different cases.
Figure 8B:
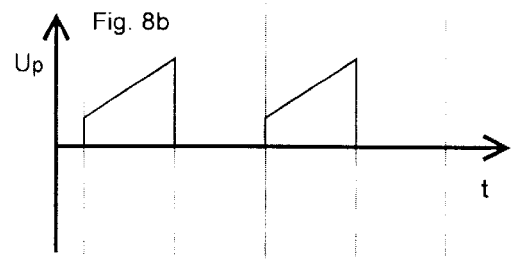
Figure 8C:
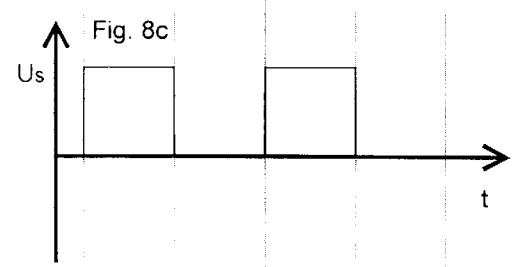
Figure 10A:
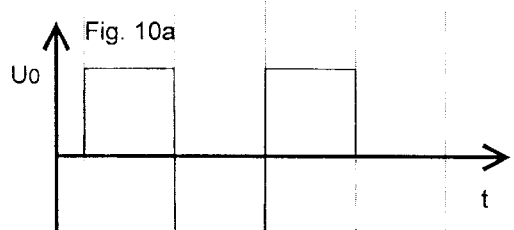
Figure 10B:
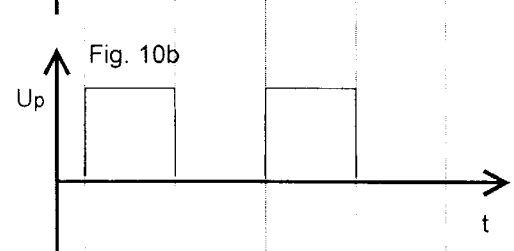
Figure 10C:
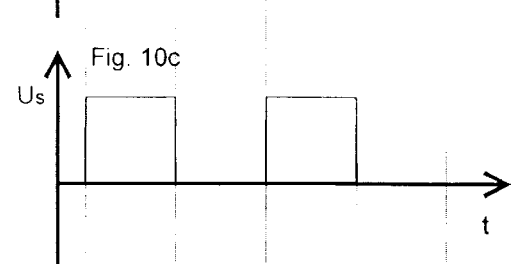
Figure 9A:
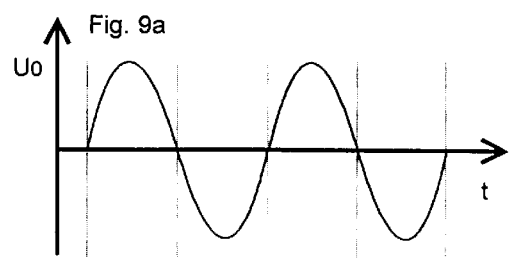
Figure 9B:
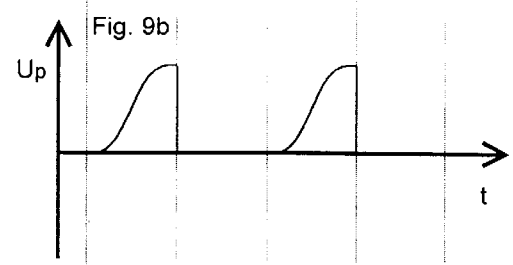
Figure 9C:
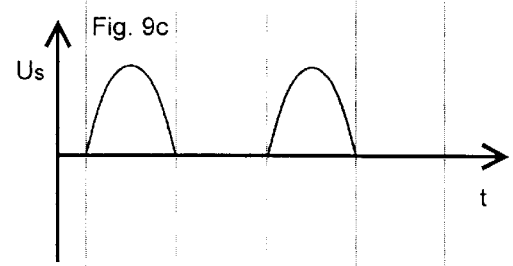
Figure 11A:
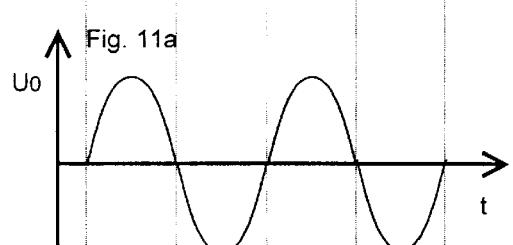
Figure 11B:
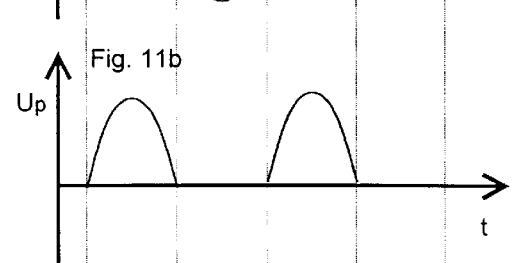
Figure 11C:
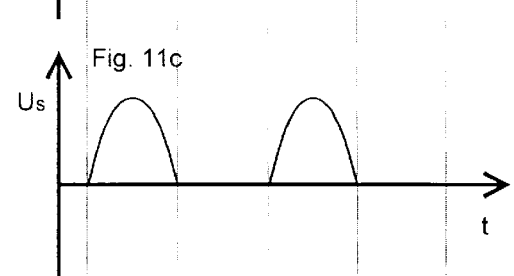

FIGS. 8a to 8c show more clearly the greatly simplified courses of time of some characteristic parameters of circuits 7b to 7e when using a ferrite core transformer for rectangular source voltage $U_0$. The primary-side voltage $U_P$ of the transformer 10 has a variation according to FIG. 8b, resulting in a secondary-side voltage $U_S$ of the transformer according to FIG. 8c which corresponds to the source voltage $U_0$ during half the period duration, whereby only every second half-wave of the source voltage $U_0$ will result at load 2. FIGS. 9a to 9c show the courses of time for the source voltage $U_0$, the primary voltage $U_P$ and the secondary voltage $U_S$ of the transformer 10 when using a ferrite core transformer for sinus-shaped source voltage $U_0$. In FIGS. 10a to 10c as well as 11a to 11c, the variations in time when using a low frequency transformer are illustrated.

Figure 12:
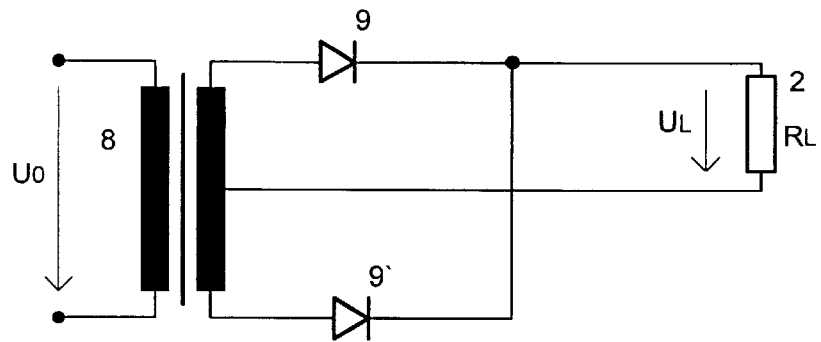
FIG. 12 shows the circuit of a full-wave rectification.

From FIG. 12, at first a conventional circuit of a full-wave rectification is shown to explain another case of employing the invention. The voltage is transformed by means of a power transformer 8 whose secondary winding comprises a transformer center cap. Via two accordingly arranged rectifying diodes 9, 9', the voltage is rectified at a load resistor $R_L$. An optional capacitor for filtering the output voltage at the load resistor is not illustrated for the sake of simplicity.

Figure 13A:
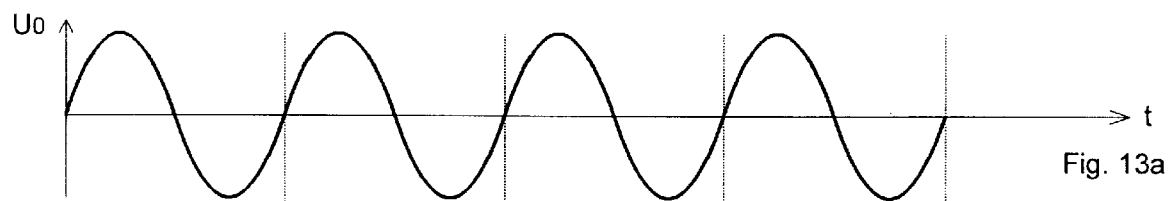
FIGS. 13a and 13b show courses of time of characteristic parameters of the circuit according to FIG. 12.
Figure 13B:
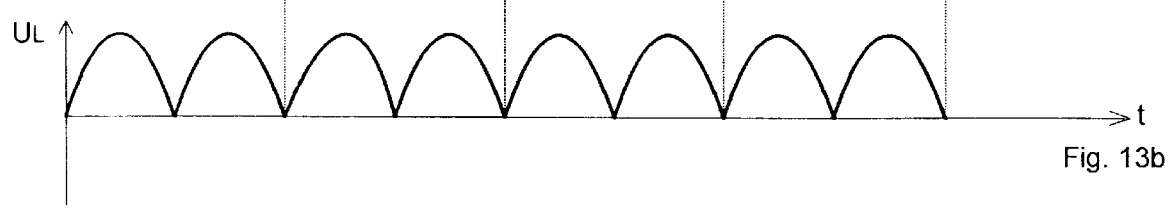

From FIGS. 13a and 13b, the variation of the network voltage $U_0$ and the voltage $U_L$ at the load resistor $R_L$ are illustrated in dependence on time.

FIG. 14 shows an alternative of the full-wave rectification according to FIG. 12, wherein the method according to the invention is employed. Thus, the electronic valves—the rectifying diodes 9, 9', in this instance—may be substituted by two counter-voltage sources which are realized by two transformers 10, 10'. The transformers 10, 10' are each switched into the circuit with their secondary side. At their primary side, the transformers 10, 10' are connected with a corresponding control and power electronic means which supplies the respective primary voltage. By the omission of the rectifying diodes 9, 9', respective forward power losses of the semiconductor devices are not incurred, either. In contrast to rectifying diodes at which a voltage is applied in the instance of conduction, the losses in the circuit of the invention are restricted to ohmic losses of the secondary winding of the transformers 10, 10' which are very low. As a consequence of the markedly reduced losses, the components may also be of correspondingly smaller size and thus substantial volume can be saved. This advantage is enhanced by the fact that the windings of the two transformers 10, 10' are mounted on a single annular core in space-saving manner. In practice, the secondary windings of the transformers 10, 10' are formed by wires of large diameter or fine-bundle wires of a very low number of turns, whereas the primary windings comprise a correspondingly higher number of turns. On account of the modern electronics, the electronic control and power devices can be realized very light, inexpensive and very small, resulting in extreme advantages as compared to the use of rectifying diodes 9, 9', at least in case of very high currents and voltages.

FIGS. 15a–15d the variationof the secondary voltage $U_0$ of the power transformer 8 with respect to time, the two primary voltages $U_{P1}$ and $U_{P2}$ of the transformers 10, 10', as well as the resulting voltage $U_L$ at the load resistor $R_L$ according to the circuit of FIG. 14. The control of the counter sources, in this instance the transformers 10, 10', preferably is effected by means of a microcontroller or microprocessor which, on account of one or more input parameters, correspondingly activates electronic power means for producing the primary voltages $U_{P1}$ and $U_{P2}$ of the transformers 10, 10'. In doing so, preferably also the frequency and polarity of the secondary voltage $U_0$ are used as input parameters, which can also be indirectly determined via the current of the primary windings of the transformers 10, 10'. In doing so, it must be ensured that always at least one transformer 10, 10' is activated, since otherwise the secondary voltage $U_0$ would be short-circuited. During the positive half-wave of the secondary voltage $U_0$, the second transformer 10' is activated by a primary voltage $U_{P2}$ such that it causes a secondary voltage $U_{S2}$ which has the same amplitude as the secondary voltage of the transformer 8 so that it will be cancelled out by the secondary voltage $U_{S2}$ of the transformer 10'. The transformer 10, on the other hand, is not activated, whereby the full secondary voltage $U_0$ is applied to the load resistor $R_L$. In case of the negative half-wave of $U_0$, the transformer 10 is activated by a corresponding primary voltage $U_{P1}$ so that the secondary voltage half-wave supplied by the transformer 8 in positive polarity gets to the load resistor $R_L$. The same voltage $U_L$ will result on the load resistor $R_L$ as in the full-wave rectifier according to FIG. 12. The regions of the minimal negative voltages of the primary voltages $U_{P1}$ and $U_{P2}$ of the transformers 10, 10' are caused by demagnetizing the transformers. In doing so, the core energy stored in the transformer is fed back to the primary side. This example of use is, of course, not restricted to full-wave rectifiers. The method according to the invention may, e.g., also be employed with a bridge rectifier in which all four rectifying diodes are substituted by counter-voltage sources formed by transformers.

To further emphasize the advantages of the method according to the invention, the use in an output rectifier of a welding tool be further mentioned as an example. The power loss of the rectifying diodes of the output rectifier of a welding tool having a welding current of 200 A will be approximately 60 to 100 watts, depending on the voltage drop at the diodes (0.3 to 0.5 V). The rectifying diodes commonly used are correspondingly large and expensive and in most instances have to be provided additionally with a cooling means. By employing the method according to the invention, no noticeable power loss will occur in the output rectifier, resulting in substantially smaller, lighter and cheaper devices. The possible fields of use of the method according to the invention or of the circuit according to the invention are manifold. Particular advantages will, however, result in circuits where a very high current and/or a very high voltage occurs at the output on the load, since in that case the power loss of conventional circuits will be particularly high. One example of such a particularly high current is a welding rectifier. High voltages will, e.g., occur on direct current short couplings.

What is claimed is:

1. In a circuit for controlling electric power, comprising an electric source (1), a load (2) connected to said source, and at least one device (3) for controlling electric power delivered by the source to the load (2), the improvement wherein said at least one device (3) for controlling the electric power delivered to the load comprises at least one transformer (10, 10') having a secondary side (10, 10') connected in said circuit between the load and the source (1), and a primary side (10, 10') connected to a control device (11), which produces a voltage or a current, respectively, at predetermined points of time and for predetermined periods of time at the primary side of the transformer so as to induce at the secondary side of said at least one transformer (10, 10') a counter voltage or current in said circuit, respectively, of identical amplitude as the voltage or current, respectively, of the source (1) such that the electric power resulting at the load (2) is substantially zero and substantially without power loss.

2. A circuit according to claim 1, wherein frequency (f) and/or pulse ratio ($t_{on}$:$t_{off}$) of the voltage or current, respectively, at the secondary side of said at least one transformer (10, 10') is changed by means of the control device (11).

3. A circuit according to claim 1, wherein the diameter of a wire or number of wire strands forming the secondary winding of said at least one transformer (10, 10') is large relative to the diameter of a wire or to a number of wire strands forming the primary winding of said at least one transformer (10, 10'), and/or a number of turns of the primary winding of said at least one transformer (10, 10') is high relative to a number of turns of the secondary winding of said at least one transformer (10, 10').

4. A circuit according to claim 1, wherein the control device (11) is connected with the source (1).

5. A circuit according to claim 2, wherein control device (11) is connected with the source (1).

6. A circuit according to claim 3, wherein control device (11) is connected with the source (1).

7. A circuit according to claim 1, wherein control device (11) is connected with the source (1).

8. A circuit according to claim 3, wherein control device (11) is connected with the source (1).

9. A circuit according to claim 1, wherein the diameter of a wire or number of wire strands forming the secondary winding of said at least one transformer (10, 10') is large relative to the diameter of a wire or to a number of wire strands forming the primary winding of said at least one transformer (10, 10'), and/or a number of turns of the primary winding of said at least one transformer (10, 10') is high relative to a number of turns of the secondary winding of said at least one transformer (10, 10').

10. A circuit according to claim 1, wherein a voltage or a current, respectively, is produced by the control device (11) substantially at a point of time of zero crossing of the voltage or current, respectively, of the source (1).

* * * * *